United States Patent
Buttrick (10) Patent No.: US 12,070,805 B2
(45) Date of Patent: Aug. 27, 2024

(54) DRILL SPINDLE ACCESSORY FOR APPLYING A MATERIAL TO AN INTERIOR SIDEWALL OF A HOLE

(71) Applicant: The Boeing Company, Chicago, IL (US)

(72) Inventor: James N. Buttrick, Seattle, WA (US)

(73) Assignee: The Boeing Company, Arlington, VA (US)

( * ) Notice: Subject to any disclaimer, the term of this patent is extended or adjusted under 35 U.S.C. 154(b) by 90 days.

(21) Appl. No.: 17/557,986

(22) Filed: Dec. 21, 2021

(65) Prior Publication Data

US 2023/0191505 A1 Jun. 22, 2023

(51) Int. Cl.
*B23B 45/00* (2006.01)
*B05C 17/00* (2006.01)
*B05D 1/26* (2006.01)

(52) U.S. Cl.
CPC ............ *B23B 45/003* (2013.01); *B05C 17/00* (2013.01); *B05D 1/26* (2013.01)

(58) Field of Classification Search
CPC . B23B 45/003–005; B05C 9/045; B05C 7/00; B05C 7/005; B05C 7/06; B05C 7/08; B05C 1/027
See application file for complete search history.

(56) References Cited

U.S. PATENT DOCUMENTS

| | | | | |
|---|---|---|---|---|
| 3,965,521 A | * | 6/1976 | Wardell | B05C 17/02 |
| | | | | 15/230.18 |
| 6,821,063 B2 | * | 11/2004 | Debat | B23C 3/02 |
| | | | | 409/137 |
| 9,643,207 B1 | * | 5/2017 | Guy | B44D 3/006 |
| 10,603,844 B2 | | 3/2020 | Khosravani et al. | |
| 2002/0094249 A1 | * | 7/2002 | Linderholm | B23B 49/023 |
| | | | | 409/143 |
| 2009/0183887 A1 | * | 7/2009 | Baber | B23D 51/16 |
| | | | | 173/217 |
| 2011/0058356 A1 | * | 3/2011 | Friedman | B25F 5/021 |
| | | | | 362/119 |
| 2016/0229552 A1 | | 8/2016 | Gross et al. | |
| 2020/0217349 A1 | | 7/2020 | Hansen et al. | |

* cited by examiner

*Primary Examiner* — Dah-Wei D. Yuan
*Assistant Examiner* — Stephen A Kitt
(74) *Attorney, Agent, or Firm* — Alleman Hall & Tuttle LLP (57) ABSTRACT

A drill spindle accessory is disclosed. The drill spindle accessory includes a fixed plate, a drive shaft, a pivot plate, and a working shaft. The drive shaft is mounted to the fixed plate. The drive shaft has a longitudinal axis that extends through a center of the fixed plate. The drive shaft is configured to be rotated by a drill motor. The pivot plate is pivotally coupled to the fixed plate at a pivot point offset from the longitudinal axis of the drive shaft. The working shaft is mounted to the pivot plate. The working shaft has a longitudinal axis that extends through a center of the pivot plate.

20 Claims, 5 Drawing Sheets

DRILL SPINDLE ACCESSORY FOR APPLYING A MATERIAL TO AN INTERIOR SIDEWALL OF A HOLE

FIELD

The present disclosure relates generally to the field of mechanical tools, and more specifically to a drill spindle accessory for applying a material to an interior sidewall of a hole.

BACKGROUND

Lightweight composite materials, such as carbon fiber reinforced plastics (CFRPs), may be employed in various structures as an alternative to metal alloys. Such composite materials provide a significant improvement in specific strength and stiffness that translates into a reduction in weight. For example, composite material may be employed in an aircraft, where the reduction in weight translates to fuel savings and lower operating costs. CFRPs comprise a matrix material, such as a resin, and a fiber material such as carbon fiber. Structural elements in the form of layers of CFRP are stacked and secured together with fasteners inserted through holes formed through the structural elements. Such fasteners are typically electrically conductive, which creates electromagnetic energy (EME) design considerations. Also, drilling a hole in a CFRP stack can create irregular surfaces in an interior sidewall of the hole that allow for gaps to form between the interior sidewall and a fastener inserted into the hole. Upon the occurrence of an EME event (e.g., a lightning strike), modest connectivity (e.g., the presence of any gaps) between the CFRP and the fastener may shunt current flow and increase current density, which can give rise to heat and thermal decomposition of surrounding material in the CFRP stack. To mitigate EME effects and fill gaps in fastener holes in CFRP components, an electrically conductive gap filling (ECGF) material can be applied to an interior sidewall of a hole prior to inserting a fastener. Rapidly and evenly coating an interior sidewall of a hole with an ECGF material can be difficult.

SUMMARY

A drill spindle accessory is disclosed. The drill spindle accessory includes a fixed plate, a drive shaft, a pivot plate, and a working shaft. The drive shaft is mounted to the fixed plate. The drive shaft has a longitudinal axis that extends through a center of the fixed plate. The drive shaft is configured to be rotated by a drill motor. The pivot plate is pivotally coupled to the fixed plate at a pivot point offset from the longitudinal axis of the drive shaft. The working shaft is mounted to the pivot plate. The working shaft has a longitudinal axis that extends through a center of the pivot plate.

A method for applying a material to an interior sidewall of a hole is disclosed. The material is transferred to an applicator having a diameter less than a diameter of the hole. The applicator is coupled to a drill motor. The applicator is inserted into the hole. While the applicator is inserted in the hole, the applicator is rotated with the drill motor and an effective application diameter of the applicator is increased to urge the applicator against the interior sidewall of the hole and transfer the material from the applicator to the interior sidewall.

The features, functions, and advantages that have been discussed can be achieved independently in various embodiments or may be combined in yet other embodiments further details of which can be seen with reference to the following description and drawings.

DETAILED DESCRIPTION

A material may be applied to an interior sidewall of a hole formed in a structure for various reasons. As one example, a conductive gap filling (ECGF) material, such as Indium alloy, can be applied to an interior sidewall of a hole of a carbon fiber reinforced plastic (CFRP) structure prior to inserting a fastener, in order to fill gaps between the interior sidewall of the hole and the fastener. Such gap filling via application of the ECGF material inhibits electromagnetic energy (EME) effects on the CFRP structure. However, evenly and rapidly coating an interior sidewall of a hole with a material can be difficult.

Accordingly, the present disclosure is directed to a method of applying a material to an interior sidewall of a hole in a rapid and even manner. The present disclosure is further directed to a drill spindle accessory that is configured to couple to a drill motor, such that rotation of the drill motor causes the drill spindle accessory to apply the material rapidly and evenly to an interior sidewall of the hole. In particular, operation of the drill motor rotates the drill spindle accessory, such that the applicator is urged against the interior sidewall of the hole. Such an approach provides more thorough application of the material to the interior sidewall of the hole in a shorter time period. Further, in applications where the drill spindle accessory is coupled to a hand-held drill motor, the drill spindle accessory can reduce operator fatigue relative to other manual material application approaches.

Figure 1:
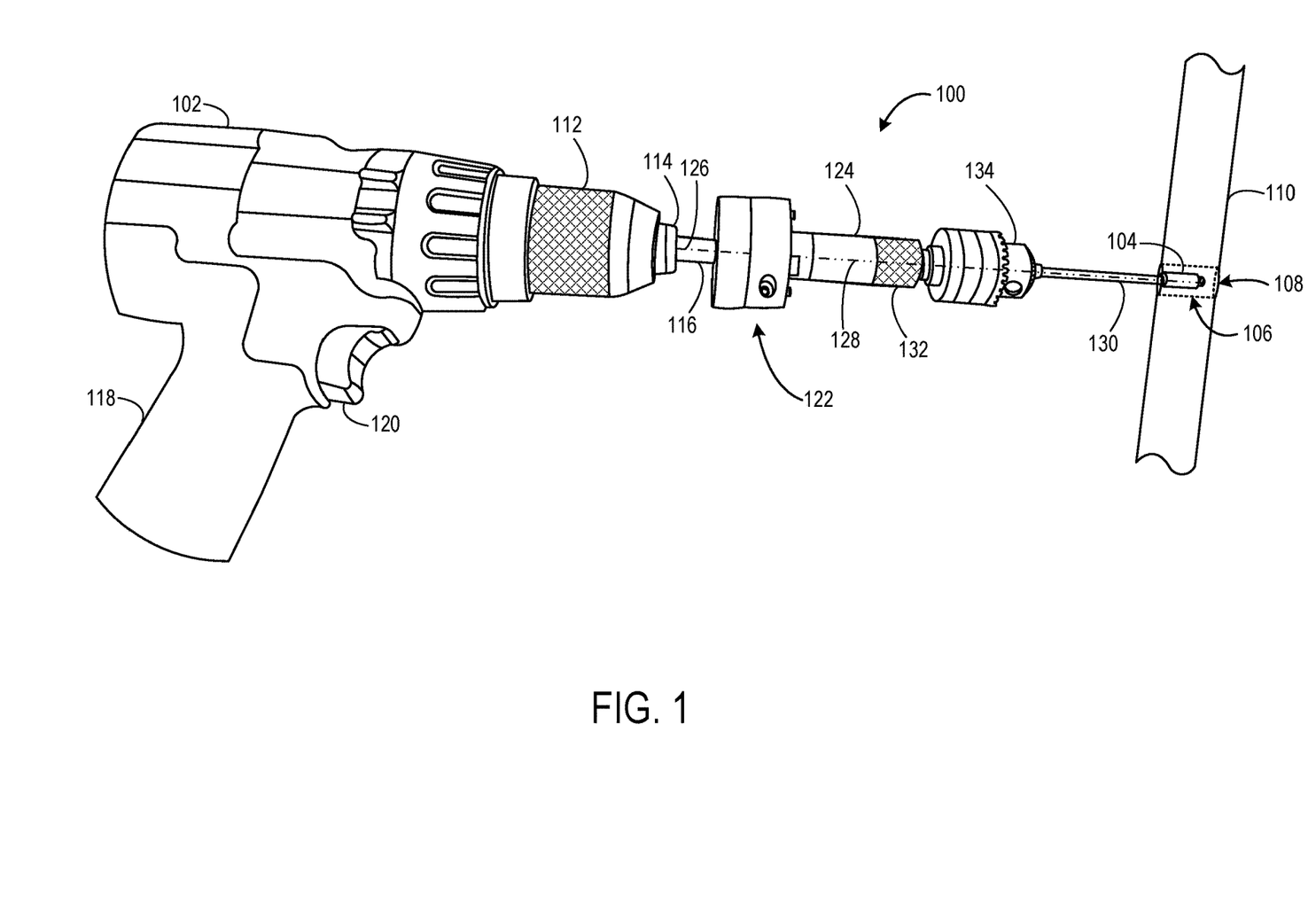
FIG. 1 shows an example embodiment of a drill spindle accessory coupled to a drill motor and configured to apply a material to an interior sidewall of a hole.

FIG. 1 shows an example drill spindle accessory 100 coupled to a drill motor 102. The drill spindle accessory 100 is configured to apply a material 104 to an interior sidewall 106 of a hole 108 formed in a structure 110 based on the drill spindle accessory 100 being rotated by the drill motor 102. In some examples, the material 104 may include an ECGF material that is applied to a hole formed in a CFRP structure of a vehicle, such as an aircraft, or another type of structure. The material 104 may include any suitable type of material that can be applied to an interior sidewall of a hole.

The drill motor 102 includes a spindle 112 and a drill chuck 114 that collectively form a rotating portion of the drill motor 102. The spindle 112 is operatively coupled to a motor (not shown) that is configured to rotate the spindle 112 and the drill chuck 114. The drill chuck 114 is configured to transition between a retention state and a release state. In the retention state, the drill chuck 114 is configured to retain the drill spindle accessory 100 (or another type of drilling tool, such as a drill bit) in a fixed position relative to the spindle 112. In the release state, the drill chuck 114 is configured to allow a drive shaft 116 of the drill spindle accessory 100 to be inserted into and removed from the drill chuck 114. In the illustrated embodiment, the drill chuck 114 may be configured to transition between the retention state and the release state by rotating the drill chuck 114 relative to the spindle 112 via manual manipulation. In other embodiments, the drill motor 102 may include another type of retention mechanism, including but not limited to, a quick release mechanism.

The drill motor 102 includes a handle 118 configured to be grasped by a hand of an operator of the drill motor 102. A trigger 120 is actuatably coupled to the handle 118. The trigger 120 is actuatable to activate the drill motor 102 and cause rotation of the drill spindle accessory 100 when the drill spindle accessory is retained in the drill chuck 114. The drill motor 102 is configured to rotate the drill spindle accessory 100 clockwise or counterclockwise based on a state of a rotation selector (not shown) of the drill motor 102.

The drill motor 102 may be powered by any suitable power source to rotate the drill spindle accessory 100. In some embodiments, the drill motor 102 may be configured to connect to a pneumatic power source, such as an air compressor. In other embodiments, the drill motor 102 may be powered via a different power source (e.g., AC power or a DC battery). The drill motor 102 is non limiting, and the drill spindle accessory disclosed herein may be adapted to work with virtually any type of drill motor.

The drill spindle accessory 100 includes a pivot assembly 122 that pivotably couples the drive shaft 116 to a working shaft 124. An applicator 130 is coupled to the working shaft 124. The applicator 130 is configured to hold the material 104. The pivot assembly 122 is configured to pivot the working shaft 124 relative to the drive shaft 116 based on rotation of the drill spindle accessory 100 by the drill motor 102 thereby urging the applicator 130 against an interior sidewall 106 of the hole 108 to transfer the material 104 from the applicator 130 to the interior sidewall 106.

In the illustrated embodiment, the drill motor 102 is a hand-held drill motor. It will be appreciated that the drill spindle accessory can be coupled with any suitable type of drill motor. In other embodiments, the drill spindle accessory can be coupled to an automated drill motor that may be used in an automated manufacturing assembly line, for example.

Figure 2:
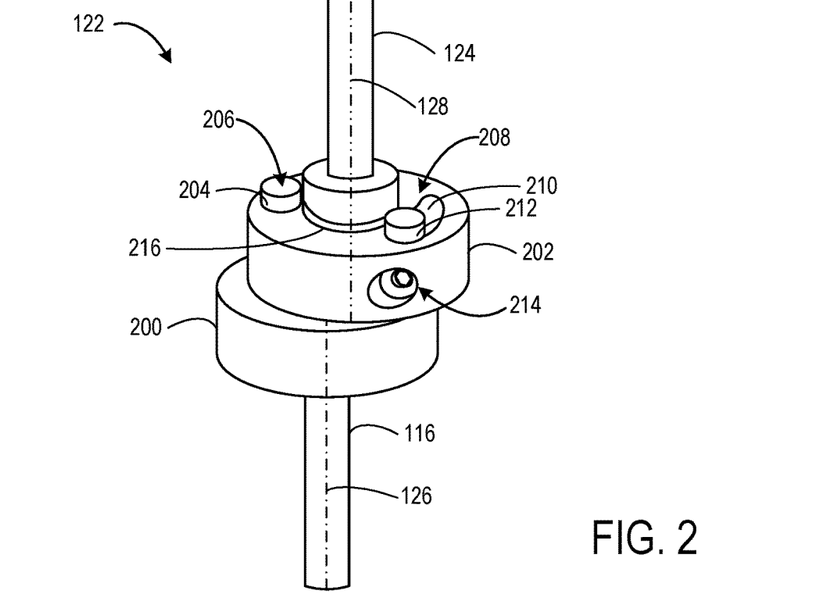
FIG. 2 shows an example embodiment of a pivot assembly of the drill spindle accessory shown in FIG. 1.
Figure 3:
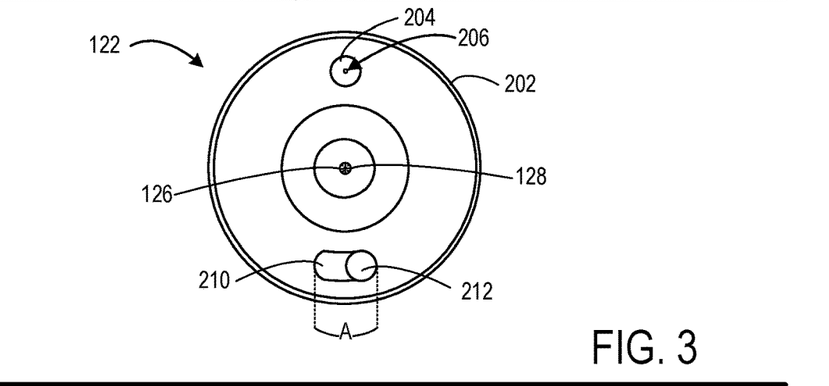
FIG. 3 shows the pivot assembly of FIG. 2 in an aligned state.
Figure 4:
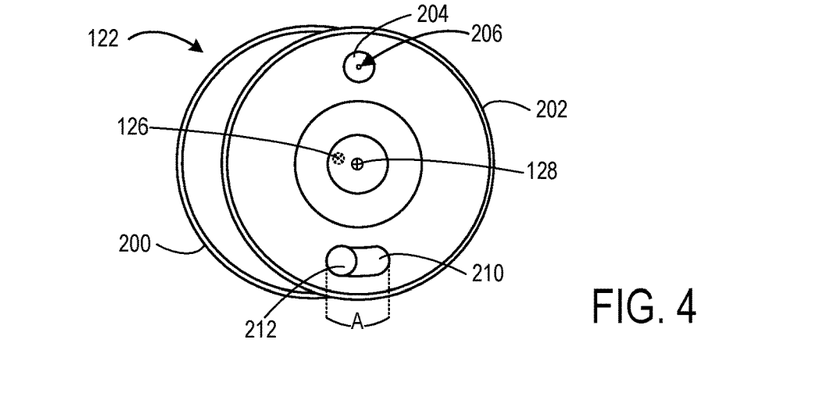
FIG. 4 shows the pivot assembly of FIG. 2 in a pivoted state.

FIG. 2-4 show aspects of the pivot assembly 122 of the drill spindle accessory 100 shown in FIG. 1. The pivot assembly 122 includes a fixed plate 200 that is mounted to the drive shaft 116. A drive shaft longitudinal axis 126 extends through a center of the drive shaft 116 and the fixed plate 200. A pivot plate 202 is pivotally coupled to the fixed plate 200 via a pivot fastener 204. The pivot fastener 204 extends through the pivot plate 202 and at least partially through the fixed plate 200 at a pivot point 206 that is radially offset from the drive shaft longitudinal axis 126. In the illustrated embodiment, the fixed plate 200 and the pivot plate 202 are circular. In other embodiments, the fixed plate and the pivot plate may assume other shapes.

A pivot stop 208 is offset from the drive shaft longitudinal axis 126 on the pivot plate 202. In the illustrated embodiment, the pivot stop 208 is positioned on a side of the pivot assembly 122 that opposes the pivot point 206. In other embodiments, the pivot stop 208 and the pivot point 206 may have a different spatial relationship in the pivot assembly 122. The pivot stop 208 is configured to limit an amount of pivot between the fixed plate 200 and the pivot plate 202. The pivot stop 208 comprises an arced slotted hole 210 in the pivot plate 202 and a pivot-stop fastener 212 extending from the fixed plate 200 into the arced slotted hole 210. The amount of pivot of the pivot plate 202 is based on an arc length (A) of the arced slotted hole 210 shown in FIGS. 3-4. The arc length (A) of the arced slotted hole 210 may be set to any suitable arc length to allow for any desired amount of pivot between the fixed plate 200 and the pivot plate 202.

In some embodiments, the pivot assembly 122 optionally may include an adjustable pivot lock 214 configured to selectively set a maximum amount of pivot between the fixed plate 200 and the pivot plate 202. The adjustable pivot lock 214 is adjustable to selectively set the maximum amount of pivot by changing the effective arc length of the arced slotted hole 210 to any suitable amount of pivot between the amount of pivot corresponding to the full arc length of the arced slotted hole 210 and zero degrees. When the adjustable pivot lock 214 sets the amount of pivot between the fixed plate 200 and the pivot plate 202 to zero degrees, the pivot plate 202 is fixed relative to the fixed plate 200 such that the drive shaft longitudinal axis 126 and the working shaft longitudinal axis 128 remain concentric. For example, the amount of pivot may be set to zero degrees in situations where the drive shaft and working shaft longitudinal axes are desired to be aligned, such as when the drill spindle accessory 100 is used to drill a hole with a drill bit.

In the illustrated embodiment, the adjustable pivot lock 214 includes a screw type fastener that is perpendicular to the pivot-stop fastener 212. The screw type fastener can be screwed in or out to adjust an amount of travel of the pivot-stop fastener 212 in the arced slotted hole 210 thereby changing the effective arc length of the arced slotted hole 210 and the amount of pivot between fixed plate 200 and the pivot plate 202. The adjustable pivot lock 214 may include any suitable mechanism to selectively set the amount of pivot of the pivot plate 202.

In some embodiments, the pivot assembly 122 optionally may include a slip washer 216 intermediate the pivot plate 202 and the working shaft 124. The slip washer 216 is configured to allow the working shaft 124 to rotate at a slower rotational speed than the drive shaft 116 when the drive shaft 116 is rotated by the drill motor 102 (shown in FIG. 1). The slip washer 216 adds friction between the drive shaft 116 and the working shaft 124, such that when the applicator 130 is being urged against the interior sidewall 106 of the hole 108 the added friction causes the applicator 130 to rotate against the sidewall 106 so that the material 104 can be evenly transferred from the applicator 130 to the interior sidewall 106. In this way, the material 104 on the applicator 130 does not become lopsided due to the same portion of the applicator 130 being urged against the interior sidewall 106 of the hole 108.

The pivot assembly 122 is configured to pivot between an aligned state and a pivoted state. FIG. 3 shows the pivot assembly 122 in the aligned state, in which the pivot plate 202 is aligned with the fixed plate 200, such that the drive shaft longitudinal axis 126 extending through the center of the drive shaft 116 is aligned with the working shaft longitudinal axis 128 that extends through the center of the working shaft 124. In the aligned state, the pivot-stop fastener 212 is positioned against a right side of the arced slotted hole 210 when the drill spindle accessory is rotated in a positive rotation direction by the drill motor 102.

FIG. 4 shows the pivot assembly 122 in the pivoted state, in which the pivot plate 202 is pivoted relative to the fixed plate 200 about the pivot point 206, such that the working shaft longitudinal axis 128 is offset from the drive shaft longitudinal axis 126. In the pivoted state, the pivot-stop fastener 212 is positioned against a left side of the arced slotted hole 210 when the drill spindle accessory is rotated in a positive rotation direction by the drill motor 102. The illustrated pivot assembly 122 is provided as one example configuration. The pivot assembly may be designed to pivot based on any intended rotation direction of a drill motor during application of a material on an interior sidewall of a hole.

Figure 5:
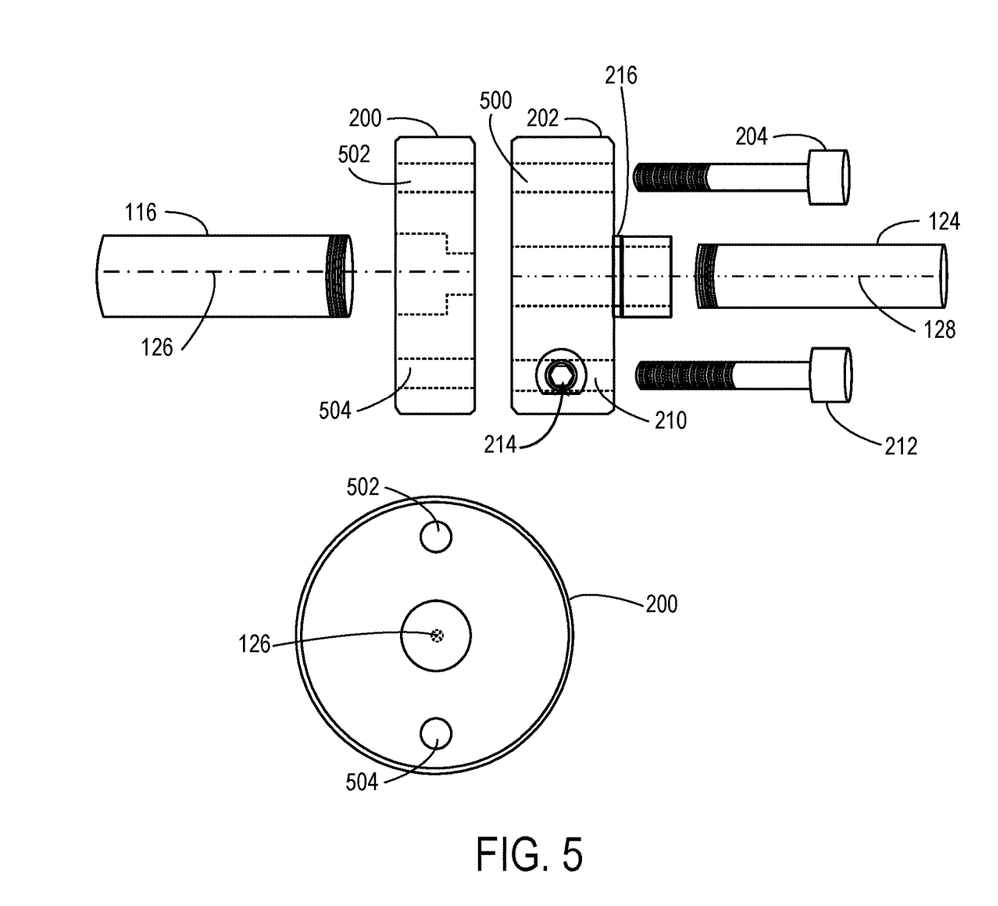
FIGS. 5-6 show aspects of the pivot assembly of FIG. 2.
Figure 6:
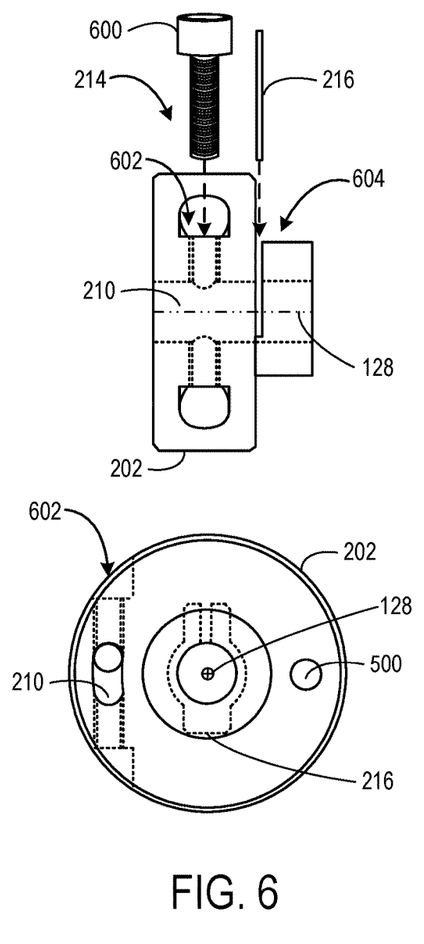

FIGS. 5-6 show additional aspects of the pivot assembly 122. As shown in FIG. 5, the pivot plate 202 includes a pivot fastener hole 500 configured to receive the pivot fastener 204. The fixed plate 200 includes a pivot fastener hole 502 that is configured to receive the pivot fastener 204 and a pivot-stop fastener hole 504 that is configured to receive the pivot-stop fastener 212. In the illustrated embodiment, the pivot fastener hole 502 of the fixed plate 200 is threaded. The pivot fastener 204 passes through the pivot fastener hole 500 of the pivot plate 202 and screws into the threads of the pivot fastener hole 502 of the fixed plate 200 to pivotably couple the pivot plate 202 to the fixed plate 200. Further, the pivot-stop fastener hole 504 is threaded. The pivot-stop fastener 212 passes through the arced slotted hole 210 of the pivot plate 202 and screws into the threads of the pivot-stop fastener hole 504 in the fixed plate 200 to form the pivot stop 208. The pivot plate 202 may be pivotably coupled to the fixed plate 200 using any suitable type of securing fastener.

As shown in FIG. 6, the adjustable pivot lock 214 includes a pivot-lock fastener 600 that screws into a pivot-lock hole 602. The pivot-lock hole 602 is perpendicular to the arced slotted hole 210. Further, the pivot-lock hole 602 intersects the arced slotted hole 210 to allow for the pivot-lock fastener 600 to interface with the pivot-stop fastener 212 to set the amount of pivot of the pivot plate 202. Further, the pivot plate 202 includes a partial cut-out 604 that is configured to receive the slip washer 216, such that the slip washer 216 couples to the pivot plate 202 and is positioned intermediate the pivot plate 202 and the working shaft 124.

Returning to FIG. 1, in some embodiments, the working shaft 124 optionally may include a quick-change chuck 132. The quick-change chuck 132 allows for an operator to quickly swap the applicator 130 out of the drill spindle accessory 100 for a different drilling tool, such as a drill bit for drilling a hole or a fresh applicator full of material to apply to a hole. The quick-change chuck 132 is configured to reside in a retention state in which the quick-change chuck 132 retains a drilling tool that is inserted into the quick-change chuck 132. For example, the quick-change chuck 132 may include a bias spring (not shown) that maintains the quick-change chuck 132 in the retention state. Further, the quick-change chuck 132 may be pulled forward along the longitudinal axis 128 of the working shaft away from the drill motor 102 with enough force to overcome the spring bias to enter into a release state in which the drilling tool can be released from the quick-change chuck 132. In other embodiments, the bias direction may be reversed such that the quick-change chuck 132 is pulled backward along the longitudinal axis 128 toward the drill motor 102 to enter into the release state. In still other embodiments, the quick-change chuck 132 may include a different type of retention mechanism for a drilling tool. In some embodiments, the quick-change chuck 132 may be omitted from the drill spindle accessory 100.

In some embodiments, the working shaft 124 optionally may include a Jacobs chuck 134. The Jacobs chuck 134 allows for an operator to quickly swap the applicator 130 out of the drill spindle accessory 100 for a different applicator or a different drilling tool. For example, when all of the material has been transferred from the applicator to the interior sidewall of the hole, but the interior sidewall is not completely covered with the material (or additional sidewalls need coating), the applicator may be swapped out for a new applicator that has material that can be applied to a sidewall of a hole. The Jacobs chuck 134 is configured to switch between a retention state and a release state. In the retention state, the Jacobs chuck 134 is configured to retain the applicator 130 in a fixed position relative to the Jacobs chuck 134. In the release state, the Jacobs chuck 134 is configured to allow the applicator 130 to be inserted into and removed from the Jacobs chuck 134. In the illustrated embodiment, the Jacobs chuck 134 is configured to switch between the retention state and the release state by rotating the Jacobs chuck 134 relative to the working shaft 124 via manual manipulation. In other embodiments, the working shaft 124 may include another type of retention mechanism, including but not limited to, a quick release mechanism. In some embodiments, the Jacobs chuck 134 may be omitted from the drill spindle accessory 100. In some examples, the applicator 130 may be incorporated directly into the working shaft 124.

The applicator 130 may be configured to hold any type of material suitable for application to an interior sidewall of a hole or another type of structure/surface where it would be desirable to urge the applicator against that structure/surface based on rotation of the drill motor.

In some examples, the material 104 is ECGF material, such as Indium alloy, that can be applied to an interior sidewall of a hole of a CFRP structure. The ECGF material can be applied prior to inserting a fastener in order to fill gaps between the interior sidewall of the hole and the fastener. Such gap filling by the ECGF material inhibits EME effects on the CFRP structure. In some embodiments, the ECGF material can be cast onto the applicator 130. For example, the applicator 130 may be threaded, so that the applicator can be screwed into a casting tool to properly position the applicator in a casting tool. Further, the threads provide a suitable surface on which the ECGF material can be affixed. The surface of the applicator 130 can be textured (knurled, threaded, etc.) in any suitable manner so that ECGF material will properly affix to the applicator 130. Moreover, the ECGF material can be affixed to the applicator 130 using any suitable process.

In one example of operation of the drill spindle accessory 100, an operator adjusts the adjustable pivot lock 214 to place the pivot assembly 122 in the aligned state such that the drive shaft longitudinal axis 126 and the working shaft longitudinal axis 128 are aligned. The operator inserts a drill bit in the quick-change chuck 132 to drill a hole in a surface by operating the drill motor 102 to rotate the drill spindle accessory 100 loaded with the drill bit.

Once the hole is drilled out, the operator swaps out the drill bit for the applicator 130. The operator adjusts the adjustable pivot lock 214 to allow the pivot assembly 122 to transition between the aligned state and the pivoted state. The operator inserts the applicator 130 into the hole and activates the drill motor 102. Rotation of the drill spindle accessory 100 by the drill motor 102 causes the pivot assembly 122 to assume the pivoted state, such that the working shaft 124 is offset from the drive shaft 116 thereby urging the applicator 130 against the interior sidewall of the hole. Moreover, the eccentric state of the working shaft 124 of the drill spindle accessory 100 produced by rotation by the drill motor 102 generates a radial (side) load on the applicator 130, which transfers the material 104 from the surface of the applicator 130 to the interior sidewall of the hole. The operator can move the applicator 130 forward and backward within the hole to fully cover the interior sidewall with the material 104. The operator may repeat this process to form a plurality of holes in the surface with the interior sidewall of each hole fully coated in the material. Since the applicator is urged toward the interior sidewall of the hole based on rotation by the drill motor, the drill spindle accessory 100 may reduce operator fatigue because the operator does not have to apply additional force through manual manipulation to urge the applicator toward the sidewall. In other examples, different drills can be dedicated to different tasks. For example, one drill could be affixed with a drill bit and dedicated to drilling holes and a different drill could be affixed with a drill spindle accessory and dedicated to coating the holes. Such an approach could be employed in an automated manufacturing process, for example.

Figure 7:
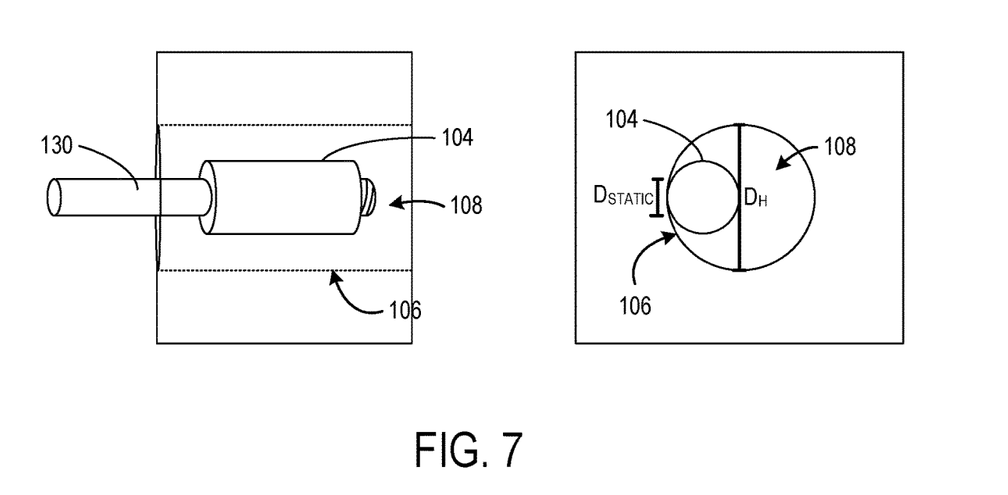
FIG. 7 shows an effective application diameter of an example applicator when the applicator is at rest.
Figure 8:
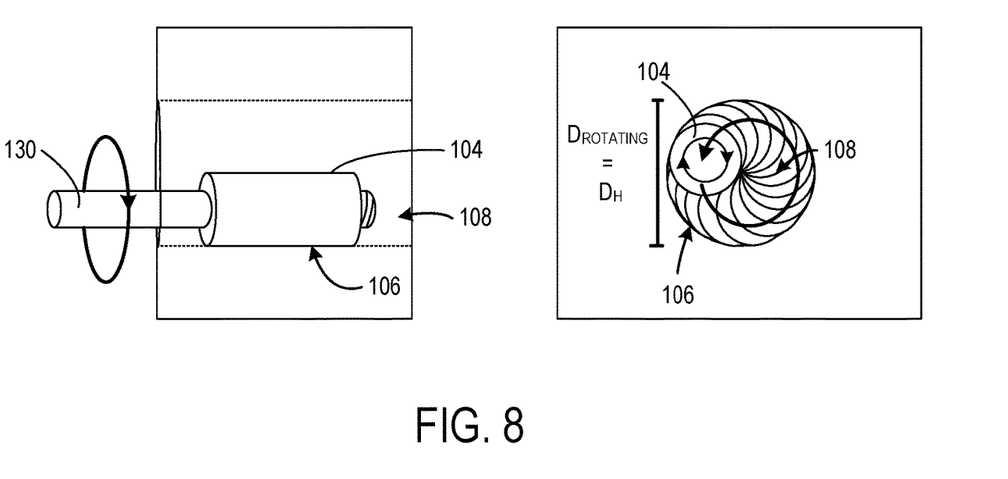
FIG. 8 shows an effective application diameter of an example applicator when the applicator is being rotated with a drill motor.

The rotation of the drill spindle accessory 100 by the drill motor 102 increases an effective application diameter of the applicator 130 that urges the applicator 130 against the interior sidewall of the hole and transfers the material from the applicator to the interior sidewall. As shown in FIG. 7, when the applicator 130 is inserted into the hole 108 and the applicator 130 is not being rotated by the drill motor, the effective application diameter of the applicator 130 (including the material 104) is ($D_{STATIC}$) which is less than the diameter of the hole (DH). As shown in FIG. 8, when the applicator 130 is inserted into the hole 108 and the applicator 130 is being rotated by the drill motor, the effective application diameter of the applicator 130 (including the material 104) is increased to ($D_{ROTATING}$) which is substantially equal to the diameter of the hole (DH). Moreover, the applicator 130 itself rotates within the larger rotation around the interior sidewall 106 of the hole 108 due to the added friction to the working shaft 124 provided by the slip washer 216. In particular, as long as the amount of friction provided by the slip washer 216 is greater than the torque applied by the applicator 130 to the sidewall 106, the applicator 130 will rotate. In this way, the material 104 evenly wears off the applicator 130 and onto the interior sidewall 106.

Various components of the herein-described drill spindle accessory may be optional. For example, in some embodiments, the adjustable spindle lock, the slip washer, the quick-change chuck, and/or the Jacobs chuck may be omitted from the drill spindle accessory. Various components of the drill spindle accessory may be differently configured in different embodiments. For example, different embodiments of the drill spindle accessory may have different types of mounts to affix the drill spindle accessory to the drill motor A drill spindle accessory may include any suitable combination of these different components, and/or other components, without departing from the spirit of this disclosure.

Note that purely manual rotation of the drill spindle accessory without being coupled to a drill motor is possible, although such a manual approach would result in a slower application of material and greater operator fatigue.

Figure 9:
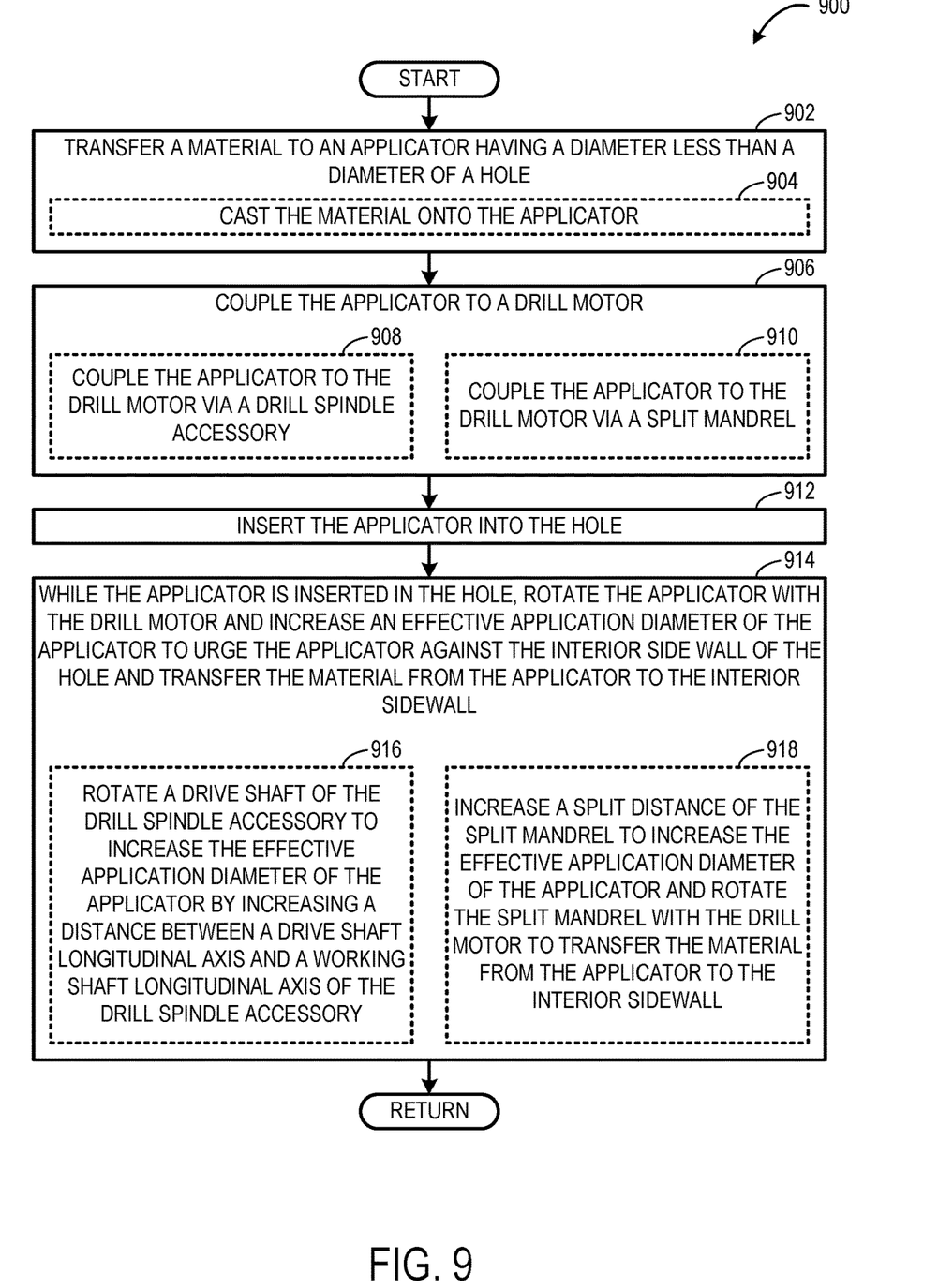
FIG. 9 is a flowchart of an example embodiment of a method for applying a material to an interior sidewall of a hole.

FIG. 9 shows an example method 900 for applying a material to an interior sidewall of a hole. In one example, the method 900 can be performed using the drills spindle accessory 100 affixed to the drill motor 102 shown in FIG. 1. In another example, the method 900 can be performed using a split mandrel affixed to a drill motor. Note that in this case the split mandrel is affixed to the drill motor in place of the drill spindle accessory.

At 902, the method 900 includes transferring a material to an applicator having a diameter less than a diameter of a hole. In one example, the material is ECGF material that is applied to a hole in a CFRP structure.

In some embodiments, at 904, the method 900 optionally may include casting the material onto the applicator.

At 906, the method 900 includes coupling the applicator to a drill motor. In some examples, the drill motor can be a hand-held drill motor. In other examples, the drill motor can be an automated drill motor. In some embodiments, at 908, the method 900 may include coupling the applicator to the drill motor via the drill spindle accessory. In other embodiments, at 910, the method 900 may include coupling the applicator to the drill motor via a split mandrel.

At 912, the method 900 includes inserting the applicator into the hole. Returning to the example shown in FIG. 7, when the applicator is at rest, the applicator has an effective application diameter ($D_{STATIC}$) that is less than the diameter of the hole (DH). In this embodiment, the applicator is coupled to the drill spindle accessory. In another embodiment where the applicator is coupled to the split mandrel, a centrally located tapered pin of the split mandrel is moved to reduce a split distance of the split mandrel so that a diameter of the split mandrel is less than the diameter of the hole so that the split mandrel can be inserted into the hole.

At 914, the method 900 includes, while the applicator is inserted in the hole, rotating the applicator with the drill motor to increase an effective application diameter of the applicator to urge the applicator against the interior sidewall of the hole and transfer the material from the applicator to the interior sidewall of the hole.

In some embodiments where the applicator is coupled to the drill spindle accessory, at 916, the method 900 may include rotating the drive shaft of the drill spindle accessory to increase the effective application diameter of the applicator by increasing a distance between a drive shaft longitudinal axis and a working shaft longitudinal axis of the drill spindle accessory. Returning to the example shown in FIG. 8, when the applicator is rotated with the drill motor via the drill spindle accessory, the effective application diameter of the applicator to an effective application diameter ($D_{ROTATING}$) that is substantially equal to the diameter of the hole (DH).

In other embodiments where the applicator is coupled to the split mandrel, at 918, the method 900 may include increasing a split distance of the split mandrel to increase the effective application diameter of the applicator and rotating the split mandrel with the drill motor to transfer the material from the applicator to the interior sidewall. In particular, the tapered pin can be moved to expand the split distance of the split mandrel and the effective application diameter to match the hole diameter.

The above-described method may be performed to coat an interior sidewall of a hole evenly and rapidly with a material. Moreover, when a hand-held drill motor is coupled with the drill spindle accessory, such a method may reduce operator fatigue relative to other manual application methods because rotation provided by the drill motor increases the effective application diameter of the applicator.

In an example, a drill spindle accessory comprises a fixed plate, a drive shaft mounted to the fixed plate and having a longitudinal axis that extends through a center of the fixed plate, the drive shaft configured to be rotated by a drill motor, a pivot plate pivotally coupled to the fixed plate at a pivot point offset from the longitudinal axis of the drive shaft, and a working shaft mounted to the pivot plate and having a longitudinal axis that extends through a center of the pivot plate. In this example and/or other examples, rotation of the drive shaft optionally may urge the pivot plate to pivot relative to the fixed plate about the pivot point. In this example and/or other examples, the drill spindle accessory optionally may further comprise an applicator coupled to the working shaft and configured to hold a material, and upon the applicator being inserted into a hole, rotation of the drive shaft urges the applicator against an interior sidewall of the hole as the pivot plate pivots relative to the fixed plate to transfer the material from the applicator to the interior sidewall. In this example and/or other examples, the working shaft optionally may include a quick-change chuck. In this example and/or other examples, the working shaft optionally may include a Jacobs chuck. In this example and/or other examples, the material optionally may be electrically conductive gap filling material. In this example and/or other examples, the electrically conductive gap filling material optionally may be cast onto the applicator. In this example and/or other examples, the drill spindle accessory optionally may further comprise a pivot stop offset from the longitudinal axis of the drive shaft and configured to limit an amount of pivot between the fixed plate and the pivot plate. In this example and/or other examples, the pivot point and the pivot stop optionally may be offset on opposing sides of the longitudinal axis. In this example and/or other examples, the pivot stop optionally may comprise an arced slotted hole in the pivot plate and a pivot-stop fastener extending from the fixed plate into the arced slotted hole, the amount of pivot optionally may be based on an arc length of the arced slotted hole. In this example and/or other examples, the drill spindle accessory optionally may further comprise a pivot fastener extending through the fixed plate and through the pivot plate at the pivot point. In this example and/or other examples, the drill spindle accessory optionally may further comprise an adjustable pivot lock configured to selectively set a maximum amount of pivot between the fixed plate and the pivot plate. In this example and/or other examples, the adjustable pivot lock optionally may be adjustable to selectively set the maximum amount of pivot at zero degrees, thereby fixing the pivot plate relative to the fixed plate such that the longitudinal axis of the drive shaft and the longitudinal axis of the working shaft remain concentric. In this example and/or other examples, the drill spindle accessory optionally may further comprise a slip washer intermediate the pivot plate and the working shaft and configured to allow the working shaft to rotate at a slower rotational speed than the drive shaft. In this example and/or other examples, the pivot plate and the fixed plate optionally may be circular.

In another example, a method for applying a material to an interior sidewall of a hole comprises transferring the material to an applicator having a diameter less than a diameter of the hole, coupling the applicator to a drill motor, inserting the applicator into the hole, while the applicator is inserted in the hole, rotating the applicator with the drill motor and increasing an effective application diameter of the applicator to urge the applicator against the interior sidewall of the hole and transfer the material from the applicator to the interior sidewall. In this example and/or other examples, the applicator optionally may be coupled to a drill spindle accessory including a fixed plate, a drive shaft mounted to the fixed plate and having a longitudinal axis that extends through a center of the fixed plate, a pivot plate pivotally coupled to the fixed plate at a pivot point offset from the longitudinal axis of the drive shaft, and a working shaft mounted to the pivot plate and having a longitudinal axis that extends through a center of the pivot plate, and rotation of the drive shaft increases the effective application diameter of the applicator by increasing a distance between the longitudinal axis of the drive shaft and the longitudinal axis of the working shaft. In this example and/or other examples, the applicator optionally may include a split mandrel and the effective application diameter of the applicator increases by increasing a split distance of the split mandrel.

In yet another example, a drill spindle accessory comprises a fixed plate, a drive shaft mounted to the fixed plate and having a longitudinal axis that extends through a center of the fixed plate, the drive shaft configured to be rotated by a drill motor, a pivot plate pivotally coupled to the fixed plate at a pivot point offset from the longitudinal axis of the drive shaft, a pivot stop offset from the longitudinal axis of the drive shaft and configured to limit an amount of pivot between the fixed plate and the pivot plate, a working shaft mounted to the pivot plate and having a longitudinal axis that extends through a center of the pivot plate, and an applicator coupled to the working shaft and configured to hold a material, and wherein upon the applicator being inserted into a hole, rotation of the drive shaft urges the applicator against an interior sidewall of the hole to transfer the material from the applicator to the interior sidewall. In this example and/or other examples, the pivot stop optionally may comprise an arced slotted hole in the pivot plate and a pivot-stop fastener extending from the fixed plate into the arced slotted hole, the amount of pivot based on an arc length of the arced slotted hole.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A drill spindle accessory comprising:
    a fixed plate;
    a drive shaft mounted to the fixed plate and having a longitudinal axis that extends through a center of the fixed plate, the drive shaft configured to be rotated by a drill motor;
    a pivot plate pivotally coupled to the fixed plate at a pivot point offset from the longitudinal axis of the drive shaft to enable the pivot plate to pivot relative to the fixed plate about the pivot point; and
    a working shaft mounted to the pivot plate and having a longitudinal axis that extends through a center of the pivot plate.

2. The drill spindle accessory of claim 1, wherein rotation of the drive shaft urges the pivot plate to pivot relative to the fixed plate about the pivot point.

3. The drill spindle accessory of claim 2, further comprising:
    an applicator coupled to the working shaft and configured to hold a material, and wherein upon the applicator being inserted into a hole, rotation of the drive shaft urges the applicator against an interior sidewall of the hole as the pivot plate pivots relative to the fixed plate to transfer the material from the applicator to the interior sidewall.

4. The drill spindle accessory of claim 3, wherein the working shaft includes a quick-change chuck.

5. The drill spindle accessory of claim 3, wherein the working shaft includes a Jacobs chuck.

6. The drill spindle accessory of claim 3, wherein the material is electrically conductive gap filling material.

7. The drill spindle accessory of claim 6, wherein the electrically conductive gap filling material is cast onto the applicator.

8. The drill spindle accessory of claim 1, further comprising:
a pivot stop offset from the longitudinal axis of the drive shaft and configured to limit an amount of pivot between the fixed plate and the pivot plate.

9. The drill spindle accessory of claim 8, wherein the pivot point and the pivot stop are offset on opposing sides of the longitudinal axis.

10. The drill spindle accessory of claim 8, wherein the pivot stop comprises an arced slotted hole in the pivot plate and a pivot-stop fastener extending from the fixed plate into the arced slotted hole, wherein the amount of pivot is based on an arc length of the arced slotted hole.

11. The drill spindle accessory of claim 1, further comprising:
a pivot fastener extending through the fixed plate and through the pivot plate at the pivot point.

12. The drill spindle accessory of claim 1, further comprising:
an adjustable pivot lock configured to selectively set a maximum amount of pivot between the fixed plate and the pivot plate.

13. The drill spindle accessory of claim 12, wherein the adjustable pivot lock is adjustable to selectively set the maximum amount of pivot at zero degrees, thereby fixing the pivot plate relative to the fixed plate such that the longitudinal axis of the drive shaft and the longitudinal axis of the working shaft remain concentric.

14. The drill spindle accessory of claim 1, further comprising:
a slip washer intermediate the pivot plate and the working shaft and configured to allow the working shaft to rotate at a slower rotational speed than the drive shaft.

15. The drill spindle accessory of claim 1, wherein the pivot plate and the fixed plate are circular.

16. A drill spindle accessory comprising:
a fixed plate;
a drive shaft mounted to the fixed plate and having a longitudinal axis that extends through a center of the fixed plate, the drive shaft configured to be rotated by a drill motor;
a pivot plate pivotally coupled to the fixed plate at a pivot point offset from the longitudinal axis of the drive shaft to enable the pivot plate to pivot relative to the fixed plate about the pivot point;
a pivot stop offset from the longitudinal axis of the drive shaft and configured to limit an amount of pivot between the fixed plate and the pivot plate;
a working shaft mounted to the pivot plate and having a longitudinal axis that extends through a center of the pivot plate; and
an applicator coupled to the working shaft and configured to hold a material, and wherein upon the applicator being inserted into a hole, rotation of the drive shaft urges the applicator against an interior sidewall of the hole to transfer the material from the applicator to the interior sidewall.

17. The drill accessory of claim 16, wherein the pivot stop comprises an arced slotted hole in the pivot plate and a pivot-stop fastener extending from the fixed plate into the arced slotted hole, wherein the amount of pivot is based on an arc length of the arced slotted hole.

18. A drill spindle accessory comprising:
a fixed plate;
a drive shaft mounted to the fixed plate and having a longitudinal axis that extends through a center of the fixed plate, the drive shaft configured to be rotated by a drill motor;
a pivot plate pivotally coupled to the fixed plate at a pivot point offset from the longitudinal axis of the drive shaft drive shaft to enable the pivot plate to pivot relative to the fixed plate about the pivot point;
a working shaft mounted to the pivot plate and having a longitudinal axis that extends through a center of the pivot plate; and
a pivot lock adjustable to set an amount of pivot between the pivot plate and the fixed plate about the pivot point.

19. The drill spindle accessory of claim 18, further comprising:
an applicator coupled to the working shaft and configured to hold a material, and wherein upon the applicator being inserted into a hole, rotation of the drive shaft urges the applicator against an interior sidewall of the hole as the pivot plate pivots relative to the fixed plate to transfer the material from the applicator to the interior sidewall.

20. The drill spindle accessory of claim 18, further comprising:
a pivot stop offset from the longitudinal axis of the drive shaft and configured to limit the amount of pivot between the fixed plate and the pivot plate, wherein the pivot stop comprises an arced slotted hole in the pivot plate and a pivot-stop fastener extending from the fixed plate into the arced slotted hole, wherein the amount of pivot is based on an arc length of the arced slotted hole.

* * * * *